United States Patent [19]
Kleven

[11] 3,842,746
[45] Oct. 22, 1974

[54] PROPORTIONAL THRUST CONTROL FOR LEVITATED VEHICLES

[75] Inventor: Lowell A. Kleven, Bloomington, Minn.

[73] Assignee: Uniflo Systems Company, Minneapolis, Minn.

[22] Filed: June 2, 1972

[21] Appl. No.: 259,314

[52] U.S. Cl. ........ 104/147 R, 104/23 FS, 246/182 R
[51] Int. Cl. ............................................. B61b 13/08
[58] Field of Search .... 104/23 FS, 130, 134, 147 R, 104/154, 155; 214/1 BE; 302/2 R, 29, 31; 243/36; 246/187 B, 45 D, 182 R

[56] References Cited
UNITED STATES PATENTS

| | | | |
|---|---|---|---|
| 3,218,454 | 11/1965 | Hughson | 246/187 B |
| 3,242,876 | 3/1966 | Berggren | 104/130 |
| 3,627,231 | 12/1971 | Kalthoff | 243/36 |

FOREIGN PATENTS OR APPLICATIONS

| | | | |
|---|---|---|---|
| 899,347 | 6/1962 | Great Britain | 246/450 |

Primary Examiner—M. Henson Wood, Jr.
Assistant Examiner—D. W. Keen
Attorney, Agent, or Firm—Dugger, Johnson & Westman

[57] ABSTRACT

Means for regulating speed of levitated vehicles moving along a track divided into control sections. The track has a plenum providing levitation and propulsion fluid through valves, and wherein the thrust provided to propel a vehicle is delivered proportionally to the elapsed time of vehicle movement between track sections or detectors.

11 Claims, 2 Drawing Figures

3,842,746

PROPORTIONAL THRUST CONTROL FOR LEVITATED VEHICLES

BACKGROUND OF THE INVENTION

1. Field of the Invention.

The present invention relates to control of thrust for levitated vehicles and more particularly controlling the thrust valve as a function of the time elapse for travel of the vehicle over a selected distance.

2. Prior Art.

Passive levitated vehicles operating along a track and provided with levitation and thrust fluid from a plenum chamber underneath the track are known. One of the problems in a vehicle system where a plurality of vehicles operate on the track is maintaining proper spacing of the vehicles on the track and at the same time keeping the speed of each vehicle within a desired range. The present disclosure relates to thrust control devices which aid in keeping proper speed and spacing of the vehicles.

SUMMARY OF THE INVENTION

The present invention relates to controlling the thrust provided to vehicles moving along a levitated vehicle track when the vehicles are passive, and receive their thrust and levitating fluid from a plenum chamber underneath the track through levitating valves and also receives thrust for forward propulsion from thruster devices. The thruster devices are controlled by valves which open fluid flow to the thruster device, and normally comprise some type of a turbine type reaction bucket system that imparts the forward motion to the vehicle. The amount of fluid being provided to the thruster devices actually controls the amount of thrust that is produced.

The present device relates to controlling the speed of a passive vehicle on a track by controlling the amount of thrust provided by the thrusters in proportion to the length of time necessary for the vehicle to traverse a given segment or segments of the vehicle track.

A basic speed and spacing control system is shown in the copending application of Charles A. Smoot and Lowell A. Kleven, U.S. Pat. application, Ser. No. 203,256, filed Nov. 30, 1971 now U.S. Pat. No. 3,771,645 for Control Systems For Vehicles Operating On A Track. The utilization vehicle detectors, levitation valves and thrust valves in a track is shown. The present application relates to the improvement of thrust control of such vehicles by varying the amount of thrust that is produced by the thrust valves or thruster sections in proportion to time elapsed as the vehicle moves between two locations along the track.

In addition, the present device illustrates connections for providing a reverse thrust to slow down a vehicle if it is overspeeding significantly, for example on a downgrade the reverse thrust could be a brake.

A form of variable thrust control valve used with the present device are shown in the copending application of Gary J. Wirth which is assigned to the same assignee as this application, and which is known to the present inventor. The said copending application of Gary J. Wirth bears Ser. No. 259,170 and is filed on even date herewith, and is entitled "Proportional On/Off Valve". These valves are therefore shown only schematically in the present application.

The invention broadly relates to controlling propulsive power to a vehicle in proportion to the speed of the vehicle.

BRIEF DESCRIPTION OF THE DRAWINGS

FIG. 1 is a schematic layout of a typical track utilizing the proportional thrust control system of the present invention.

DESCRIPTION OF THE PREFERRED EMBODIMENT

Figure 2:
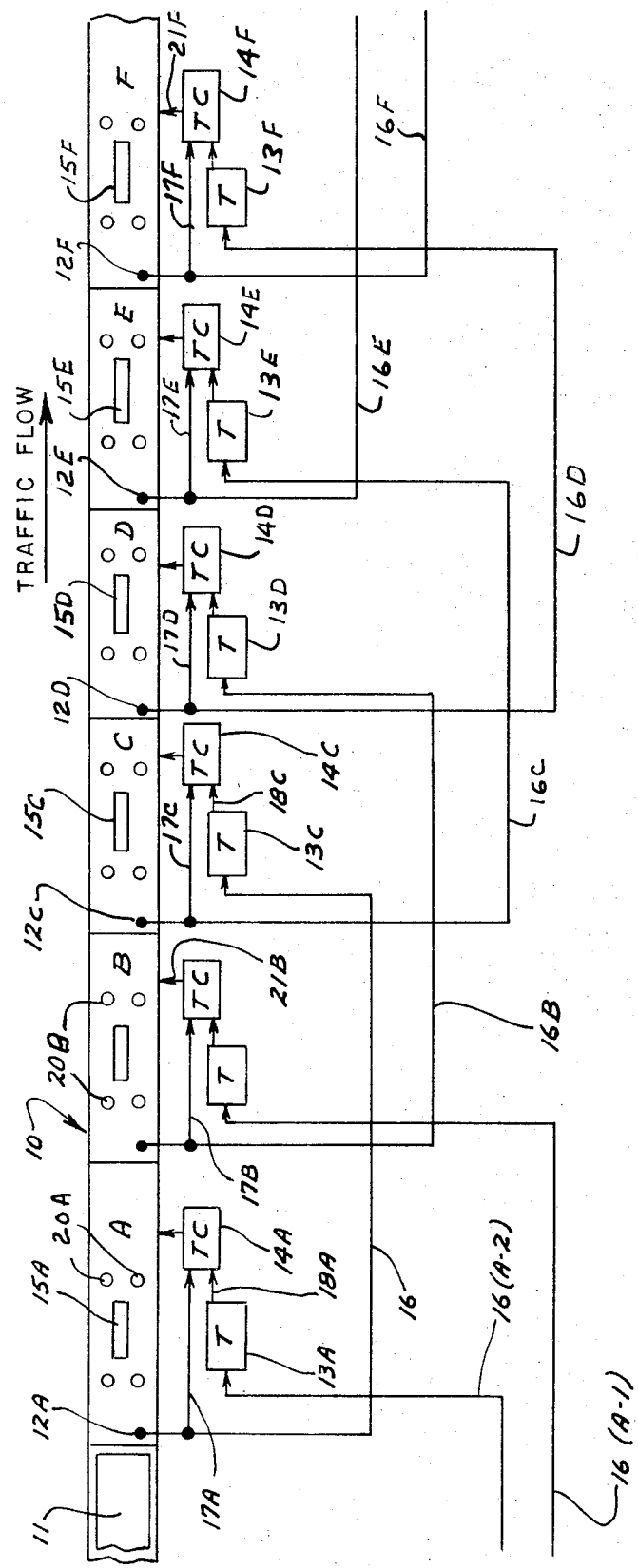
FIG. 2 is a part schematic view of control valve systems operated to provide a signal which will adjust thrust control valves in accordance with the present invention.
Figure 2:
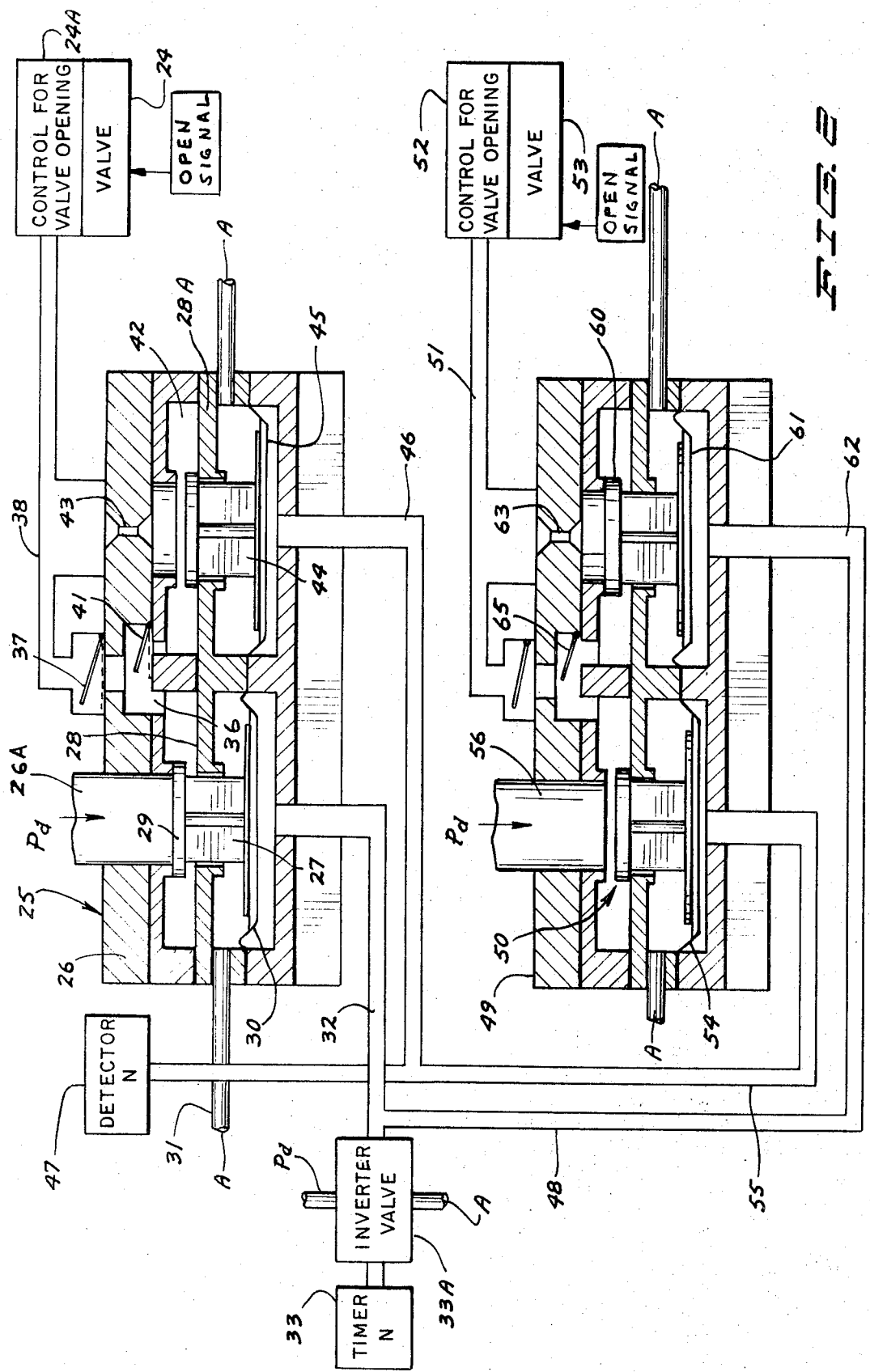

The exact details of the track, including the fluid levitating valves, vehicle detectors and the like are shown in the aforementioned U.S. Pat. application of Charles H. SMOOT, et al, Ser. No. 203,256, filed Nov. 30, 1971 now U.S. Pat. No. 3,771,465 for Control Systems For Vehicles Operating On A Track, the pertinent portion of which is incorporated herein by reference. Therefore the description here will be limited in these details, and will deal with the concept of proportioning the thrust for speed control of the vehicles in relation to the timers and valve controls shown in that application. The details of the plenum chamber, and the levitating valves are also well known.

Referring to FIG. 1, a vehicle track indicated generally at 10 is made up of a deck divided into a plurality of individual sections of selected length. Valves will provide levitation and propulsion for a vehicle indicated generally at 11 thereon. The vehicles are levitated through valves in the track deck which deliver fluid under pressure from a plenum chamber to the underside of the vehicle. The vehicle speed is controlled by thrust valves or thruster sections, which may vary the amount of thrust to vehicles in the individual track sections. The track sections in FIG. 1 are designated A, B, C, D, E, and F. Thrust provided to a vehicle is supplied through valves, and the valves are designated to provide thrust fluid ranging from zero thrust (off) up to a maximum. As shown, the time required for a vehicle to travel the length of two track sections determines how much thrust will be provided. When a vehicle detector indicated generally at 12A is tripped, by a vehicle 11, it energizes a timer associated with the thrust control valves for track section C which is the two track sections ahead. This spacing or distance on the track for timing purposes can be selected at any convenient distance. As shown, the vehicle detector 12A initiates a timer 13C. All of the timers will be designated with the numeral 13 with the guideway letter to indicate which timer is being discussed. In addition, the thrust control valve assemblies 14A–14F for each of the track sections operate turbine type thruster sections 14A–14F by controlling fluid flow to these thruster sections. The thrust control valves 14A–14F and the thruster sections can be of the form shown in the copending application of Gary J. Wirth, Ser. No. 259,170 filed on even date herewith for Proportional On/Off Valve. The thrust control valves actually include a control portion and a valve portion and have the capability of controlling the amount of flow of fluid through the valve to the thruster and therefore of controlling the thrust which is produced by the thruster sections 15A–15F.

In the schematic diagram of FIG. 1, the pneumatic conduits for the all pneumatic system are indicated by straight lines. The individual vehicle detectors have timer actuating signal lines 16A–16F, and also thrust control lines 17A–17F leading to the thrust control valve assemblies 14A–14F. Also, the timers 13A–13F have a timer signal output line 18A–18F leading to its associated thrust control valve 14 as well. The levitating valves are indicated only generally at 20 and there may be several more than those shown. The thruster sections 15 are also only indicated generally and they can be arranged as desired throughout the individual track sections.

The thrust control valves and the thrusters 15 are made to control flow of fluid from a duct or fluid pressure source to levitate and provide thrust to the vehicle. The connection lines from the thrust control valve assemblies to the thrusters are indicated only schematically at 21A–21F, and can be any kind of desired conduit or connection chamber.

When a vehicle 11 hits the vehicle detector 12A, it starts the timer 13C running, this timer 13C being two sections ahead. The timer 13C is set to a value which will just time out as the vehicle hits the vehicle detector 12C, if the vehicle is running at the right speed. When the timer 13C runs out, so that there is no timer output signal on the output line 18C for this setion, thrust will be provided. The amount of thrust, for example for the track section C, is adjusted by the thrust control valve 14C from a minimum value as soon as the time period for timer 13C expires (almost zero thrust) to a value which is determined by the time elapsed after timer 13C has run out until the detector 12C is tripped by a vehicle. If the detector 12C is not tripped before the thrust control valve 14C reaches its maximum value, then the thrust from the thruster Section 15C will be at the thrust maximum value. Therefore if the vehicle is slow in reaching detector 12C after tripping detector 12A, and is sufficiently slow so that the thrust control valve 14C has timed out of its adjustable period the maximum thrust would be applied to the vehicle in Section C of the track. The thrust valves 14C will open automatically in response to a separate signal. This signal is usually a levitation pressure signal that is sensed by a port in the track and which indicates a vehicle is above the thruster 15.

The same action takes place for each of the individual track sections, and the thrust control valve assemblies 14A–14F regulate the thrust in proportion to the time elapsed after expiration of a particular guideway section timer 13 until that particular guideway section vehicle detector is tripped. If the time exceeds a preselected amount, maximum thrust will be provided by the thrust control devices 14C.

FIG. 2 shows a control module for determining pneumatically the point at which the thrust control valves are set. The amount of thrust or propulsive power that the valves will produce through the thruster sections 15A–15F is the quantity controlled. FIG. 2 illustrates by way of example that not only forward thrust controls but also reverse thrust controls also can be utilized with the thrust control devices. However, for understanding of the basic forward proportional thrust control as described in connection with FIG. 1, the upper thrust control module illustrated generally at 25 is used for controlling thrust valves which impart forward thrust to a vehicle 11 on the track. The modules provide the proportional thrust control signal. The module 25 includes a housing 26, and an inlet conduit 26A leading from duct pressure (greater than atmospheric) which is indicated as $P_d$. The duct pressure is pressure in the plenum chamber under the track surface. The housing 26 has a control poppet valve 27 therein which has a cross shaped shank slidably extending through an opening in a divider wall 28 in the housing. The shank permits fluid passage along the shank when a valve head 29 is moved away from wall 28. The head 29 is adapted to close off the conduit 26A when the valve 27 is in its olid line position. The movement of the valve 27 is controlled by a diaphragm 30 that is open at one side to atmospheric pressure (indicated as A) through a conduit 31, and the other side of the diaphragm forms a chamber having a conduit 32 leading therefrom. The conduit 32 is connected to the output of a pneumatic timer 33 for a track section labeled "N" which could be any of the sections shown. An inverter valve 33A is connected in circuit so that when the timer is running and its output is high, the pressure in conduit 32 will be low (atmosphere) and when the output of timer 33 is low (the time period has expired) the signal on conduit 32 will be duct pressure $P_d$. The inverter valve can be any desired form of pneumatic valve.

It should be noted that the conduits are shown schematically and they may be any form of conduit suitable for carrying fluid under pressure. The shank of valve 27 provides communication between the upper chamber formed by wall 28 and the atmospheric conduit 31 when the valve is in its solid line position. This position is when the timer is not running. The upper chamber also communicates through a passageway 36 and through a check valve 37 to a conduit 38 leading to the control portion 24A of the valve 24. A chamber 42 formed in the housing 26 is also open through a one way check valve 41 to the passageway 36. The control portion 24A is a pressure chamber which will store a quantity of fluid under pressure.

The conduit 38 also is open through a restrictive orifice 43 to the chamber 42, and flow through this orifice 43 may be clamped off or stopped by a clamp valve member 44 slidably mounted in a divider wall 28A of the housing. The valve member 44 is controlled by a diaphragm 45. Diaphragm 45 may be moved by fluid under pressure in a control chamber supplied through a conduit 46 leading from a vehicle detector 47 for the same track section as timer 33. The detector 47 is designed so that when a vehicle is present a fluid pressure signal is present on the output line 46, as described in the aforementioned application of Charles H. Smoot, et al.

For initial consideration of operation of the variable thrust control, it is first assumed that the timer period has not expired. For example if timer 33 was running, the inverter valve 33A then would connect the conduit or line 32 to atmospheric pressure. Atmospheric pressure on line 32 permits the valve 27 to drop down and head 29 moves away from duct 26A, and fluid under duct pressure will flow through the passageway 36, through check valve 37 and conduit 38 to the control portion 24A for the thrust control valve 24. The fluid in the control 24A for the valve 24 locks the valve 24 closed so that the valve for providing thrust will not open (even if a separate signal is given for the valve to open) during the time that the timer 33 is on.

Assuming that the time period of timer 33 expires so that the signal at line 32 goes back to duct pressure, the pressure on diaphragm 30 will move valve 27 to its solid line position. The valve head 29 will be closed against the duct opening 26A closing off duct pressure to the conduit 38 and the control chamber 24A. The chamber above wall 28 will be connected to atmosphere past the shank of valve 27. Check valve 37 will close preventing reverse flow of fluid into passageway 36 through this check valve. Assuming that the detector 47 does not detect a vehicle so that its output is low on line 46, valve 44 will be in its solid line position. Fluid can flow through the orifice 43 into the chamber 42, through check valve 41 and back into passageway 36, and out along the shank of valve 27 to atmospheric pressure through duct 31. If the vehicle detector 47 is not tripped until all of the pressure in line 38 is relieved, then the control portion 24A will be set to permit thrust valve 24 to open to its maximum opening. However, assuming the situation where a vehicle is present over the detector 47 for a particular track section under consideration, after the timer has expired but before all the fluid in control 24A has bled out. A pressure signal will be applied to line 46, and this pressure will move diaphragm 45 upwardly clamping the head of valve 44 against the opening from orifice 43 and shutting off fluid flow from conduit 38 or in other words clamping the volume of fluid in control 24A. The amount of fluid in the control 24A determines the opening of the valve 24.

If the vehicle detector is tripped immediately after the timer 33 expires in time, the amount of opening of the valve 24 permitted by control 24A will be very small. If some time has passed the amount of opening of the valve 24 will increase up to the maximum amount. Valve 24 then is used for providing forward thrust to the vehicle in the normal direction of traffic flow as shown in FIG. 1. More than one valve can be controlled by one control module if desired Thus several valves 24 can be connected to conduit 38.

If desired, thrust valves can be arranged for providing a reverse thrust to the vehicle. The reverse thrust control would be used for example if the vehicle was going too fast and some reverse thrust was to be applied to the vehicle to slow it down. On downgrades this can be quite important. A second control housing identical to the control housing just described is provided and is shown in the lower portion of FIG. 2. This control module 49 operates in exactly the same manner, but with reversed inputs. Therefore the numbering of the housing will be kept to a minimum, with only general numbers being used. A valve 50 is the valve that controls the fluid pressure flow from a duct 56 to the conduit 51 which connects to the control portion 52 for the reverse acting thrust valves 53. The valve 50 is controlled by a diaphragm 54. The diaphragm 54 operates in response to pressures in a conduit 55 which is a branch of the conduit 46 from the vehicle detector 47. Thus, whenever the detector 47 is passive, when a vehicle is not present in the associated track section, the valve 50 will be in its solid line position shown in FIG. 2, but when a vehicle is detected by detector 47 the valve 50 will be in position closing off the inlet duct 56 to this valve.

The thrust clamping valve indicated at 60 is controlled by movement of a diaphragm 61, and the diaphragm 61 is moved by pressure supplied through a conduit 62 that is a branch line from the conduit 32. The housing 49 has a restriction orifice 63 controlled by the clamp valve 60.

Whenever the timer 33 is at a point where its time period has expired, the presence of a pressure signal in conduit 62 will hold the valve 60 closed so that the fluid pressure in line 51 will act through control 52 to clamp the thrust valves 53 completely closed (valve 50 is open). As long as the valve 60 is clamped closed preventing the valve 53 from opening, the movement of the valve 50 will not affect operation at all. Therefore, once the reverse thrust valves are clamped closed, which occurs as soon as the timer period for timer 33 runs out, and with no vehicle present at detector 47 (the detector for the same section) there will be no reverse thrust, but only forward thrust.

Relating back to track Section C in FIG. 1, if a vehicle trips the detector 12C before the time period for the timer 13C runs out, the vehicle is going too fast. Therefore assuming that the detector 47 is the detector at track Section C, and the time period of timer 33, also related to Section C is still running, a pressure signal will be present in the line 46 to clamp the forward thrust control valves closed by moving valve 44 to its closed position (valve 27 will still be open because timer 33 is still running) and the pressure signal in conduit 55 will move valve 50 to shut off duct 56. Again assuming that the timer 33 is still running, the valve 60 would be open because the pressure in conduit 62 is low and fluid from the control chamber 52 and line 51 will flow through the orifice 63 out through the provided check valve 65 and to atmosphere around the shank of the valve 50. The check valve 66 will close to prevent reverse flow from conduit 51 except through orifice 63. The reverse thrust valves 53 are pressure responsive automatically opening valves responsive to a vehicle above the valves, and they will be permitted to open until the vehicle has passed away from the valves.

The amount of opening of the reverse thrust valve would be dependent upon whether or not the timer period ran out while the reverse thrust valves were open. If the time period does run out, the valve 60 would move to its solid line position and the amount of opening of the valve 53 would be a function of the amount of fluid bled out of valve control 52 before the valve 60 closed. The reverse thrust will continue to be applied until the signal from the vehicle detector 47 was removed, which would again provide fluid under duct pressure to the control chamber 52, or until the vehicle moved away from the sensing device delivering the open signal for automatically opening the valve 53.

It should be pointed out that the automatically opening valves are well known and usually are sensitive to levitation pressure underneath a vehicle 11 that is being levitated along the guideway. When this levitation pressure is sensed, the valves automatically open in a well known manner, and this also is explained in combination with the application of Gary J. Wirth on the thrust valve assemblies.

The control chambers 24A and 52 control the amount that the valve can open when the separate signal that normally opens the valves is received. Whether the valves will open at all is determined by a separate signal from a source indicated in FIG. 2. The size or amount of the valve opening is determined by the amount of fluid in control chambers 24A and 52.

It should be noted that the description has been in combination with a pneumatic or fluid control system, but the proportional thrust control may also be used with electrically controlled systems by using appropriate valves and electrical timers and vehicle detectors.

What is claimed is:

1. A proportional propulsive power control system for vehicles moving along a track under propulsive power comprising means dividing said track into a plurality of sections including vehicle detectors at each of said sections, means for timing the traversing of said vehicles between two of said vehicle detectors, and control means responsive to passage of a selected vehicle past one of said vehicle detectors for supplying a variable control signal for controlling propulsive power to said selected vehicle in a selected track section, said signal being variable in proportion to the elapsed time subsequent to a selected time period required for said selected vehicle to move from said one vehicle detector to a second vehicle detector.

2. The combination as specified in claim 1 and means to initiate said control means to vary across a control cycle upon the expiration of the time period normally required for said selected vehicle to move from said one vehicle detector to said second vehicle detector.

3. A proportional thrust control system for controlling the movement of levitated vehicles along a guideway including vehicle detector means effectively dividing said guideway into individual sections, timer means associated with at least some of said sections to time the movement of said vehicles between first and second selected vehicle detectors, said second vehicle detector being associated with the guideway section associated with said timer means, separate means for providing propulsive power to a vehicle in at least some sections of said guideway, means to prevent propulsive power from being provided to said vehicles on a guideway section associated with said timer means during the timer means time period, means to provide a control signal to regulate the separate means for supplying propulsive power as a function of the value of said control signal, and means to vary the value of said control signal across a range of values subsequent to the end of said timer means time period until said second vehicle detector detects a vehicle prior to the end of a preselected second time period after the timer means time period has expired.

4. The combination as specified in claim 3 wherein said means to vary the value of said control signal comprises a fluid chamber, said fluid chamber being normally maintained at a first fluid quantity during the time period of said timer means, means to permit fluid to bleed from said chamber at a controlled rate immediately after the expiration of said timer means time period, and means to disable said means to permit fluid to bleed from said chamber to prevent fluid loss from said chamber in response to a selected vehicle detector detecting a vehicle.

5. The combination of claim 4 wherein said means to permit fluid to bleed from said chamber comprises an orifice, and said means to disable comprises a valve closing off flow through said orifice.

6. The combination of claim 5 wherein said means to provide said control signal comprises a set valve to connect said chamber to a source of fluid under pressure whenever the timer means is in its time period.

7. The combination of claim 3 wherein there are two means to provide a signal to control propulsive power, a second of said means to control propulsive power controlling power for braking action of a vehicle.

8. The combination as specified in claim 3 wherein said means to provide propulsive power comprises a fluid control valve which opens in response to a separate signal, and said control means includes means to regulate the amount that said fluid control valve opens to control the propulsive power supplied by said fluid control valve as a function of said control signal.

9. The combination as specified in claim 8 wherein said means to regulate the amount said valve opens comprises a fluid chamber, means controlling the amount said valve opens in proportion to the amount of fluid in said fluid chamber, means to connect said chamber to a fluid pressure source during the time period of said timer means, and bleed orifice means to control flow of fluid from said chamber subsequent to the expiration of said timer means time period, said fluid pressure source being disconnected from said chamber after expiration of said timer means time period, and means responsive to detection of a vehicle by said second selected vehicle detector to prevent further flow of fluid from said chamber through said bleed orifice means.

10. A thrust control system for propelled vehicles operating along a track comprising means dividing said track into a plurality of sections including vehicle detectors at each of said sections, means for timing the traversing of said vehicles between two of said vehicle detectors, and control means responsive to passage of a vehicle past one of said vehicle detectors for supplying a variable control signal for controlling propulsive power to said vehicle in a selected track section including means to provide a pneumatic pressure signal which changes in value between selected limits in proportion to the elapsed time subsequent to expiration of a selected time period after initiation of the means for timing associated with said one vehicle detector, and means controlling propulsive power to a vehicle in said selected track section as a function of the value of said pneumatic pressure signal.

11. The combination as specified in claim 10 wherein said means to vary said pneumatic pressure signal comprises a bleed orifice, and means to prevent flow through said bleed orifice when the second vehicle detector detects a vehicle.

* * * * *

PO-1050
(5/69)

UNITED STATES PATENT OFFICE
CERTIFICATE OF CORRECTION

Patent No. 3,842,746          Dated  October 22, 1974

Inventor(s)  Lowell A. Kleven

It is certified that error appears in the above-identified patent and that said Letters Patent are hereby corrected as shown below:

Column 1, line 46 "3,771,645" should be --3,771,463--.
Column 2, line 20 "3,771,465" should be --3,771,463. Column 3, line 27 "setion" should be --section--.

Signed and sealed this 7th day of January 1975.

(SEAL)
Attest:

McCOY M. GIBSON JR.          C. MARSHALL DANN
Attesting Officer            Commissioner of Patents